United States Patent
van Loon et al.

(10) Patent No.: US 9,781,743 B2
(45) Date of Patent: *Oct. 3, 2017

(54) TELECOMMUNICATIONS NETWORK AND METHOD FOR TIME-BASED NETWORK ACCESS

(71) Applicants: Koninklijke KPN N.V., The Hague (NL); Nederlandse Organisatie voor Toegepast-Natuurwetenschappelijk Onderzoek TNO, Delft (NL)

(72) Inventors: Johannes Maria van Loon, Zoetermeer (NL); Michael Robert Schenk, The Hague (NL)

(73) Assignee: Koninklijke KPN N.V., The Hague (NL)

( * ) Notice: Subject to any disclaimer, the term of this patent is extended or adjusted under 35 U.S.C. 154(b) by 61 days.

This patent is subject to a terminal disclaimer.

(21) Appl. No.: 14/297,767

(22) Filed: Jun. 6, 2014

(65) Prior Publication Data

US 2014/0287721 A1  Sep. 25, 2014

Related U.S. Application Data (63) Continuation of application No. 12/919,965, filed as application No. PCT/EP2009/001214 on Feb. 19, 2009, now Pat. No. 9,014,667.

(30) Foreign Application Priority Data

Feb. 29, 2008 (EP) .................................... 08003753

(51) Int. Cl.
*H04W 28/02* (2009.01)
*H04W 12/06* (2009.01)
(Continued)

(52) U.S. Cl.
CPC ............. *H04W 74/04* (2013.01); *H04M 3/38* (2013.01); *H04W 4/001* (2013.01); *H04W 4/005* (2013.01);
(Continued)

(58) Field of Classification Search
CPC ..... H04W 4/005; H04W 48/02; H04W 48/06; H04W 12/08; H04W 4/00; H04W 48/08;
(Continued)

(56) References Cited

U.S. PATENT DOCUMENTS 5,999,526 A    12/1999  Garland et al.
6,813,496 B2   11/2004  Numminen et al.
(Continued)

FOREIGN PATENT DOCUMENTS

CN    101106417 A    1/2008
EP    0788287         8/1997
(Continued)

OTHER PUBLICATIONS

"Telecommunications network", Encyclopaedia Britannica, Encyclopaedia Britannica Online. Encyclopaedia Britannica inc., 2014, Web. Sep. 30, 2014 <http://www.britannica.com/EBchecked/topic/585829/telecommunications-network>.
(Continued)

*Primary Examiner* — Khawar Iqbal
(74) *Attorney, Agent, or Firm* — McDonnell Boehnen Hulbert & Berghoff LLP (57) ABSTRACT

The invention relates to a telecommunications network configured for providing access to a plurality of terminals is proposed and a method therefore. Each terminal comprises a unique identifier for accessing the telecommunications network. The telecommunications network comprises a register, an access request receiver and an access module. The register is configured for storing the unique identifier of at
(Continued)

least one terminal in combination with at least one grant access time interval, or an equivalent thereof, during which access for the terminal is permitted. The access request receiver is configured for receiving the access request and the unique identifier for accessing the telecommunications network from the terminal. The access module is configured for denying access for the terminal if the access request is received outside the time interval, or the equivalent thereof.

32 Claims, 6 Drawing Sheets

(51) Int. Cl.
    *H04W 48/08*     (2009.01)
    *H04W 74/04*     (2009.01)
    *H04M 3/38*     (2006.01)
    *H04W 4/00*     (2009.01)
    *H04W 76/02*     (2009.01)
    *H04W 8/26*     (2009.01)
    *H04W 60/00*     (2009.01)
    *H04W 74/00*     (2009.01)

(52) U.S. Cl.
    CPC ....... *H04W 28/0247* (2013.01); *H04W 48/08* (2013.01); *H04W 74/002* (2013.01); *H04W 76/021* (2013.01); *H04W 8/26* (2013.01); *H04W 12/06* (2013.01); *H04W 60/00* (2013.01); *H04W 74/00* (2013.01)

(58) Field of Classification Search
    CPC ... H04W 48/00; H04W 12/06; H04W 76/046; H04W 52/0229; H04W 28/08; H04L 63/108; H04L 67/18; H04L 63/102; G06F 21/31; G06F 21/34; G06Q 30/04; H04M 3/38; H04Q 7/20
    USPC .................. 455/411, 423, 435.1, 453.2, 453; 370/230.1
    See application file for complete search history.

(56) References Cited

U.S. PATENT DOCUMENTS

| | | | |
|---|---|---|---|
| 7,007,087 B1 | 2/2006 | Souma | |
| 7,075,890 B2 | 7/2006 | Ozer et al. | |
| 7,231,360 B2 | 6/2007 | Sy | |
| 7,447,774 B2 | 11/2008 | Viswanath et al. | |
| 7,505,755 B2 | 3/2009 | Taniguchi et al. | |
| 7,519,354 B2 | 4/2009 | Lee et al. | |
| 7,774,008 B2 | 8/2010 | Benaouda et al. | |
| 7,821,935 B2 | 10/2010 | Park et al. | |
| 7,995,538 B2 | 8/2011 | Patrick et al. | |
| 8,005,037 B2 | 8/2011 | Ishii et al. | |
| 8,028,327 B1* | 9/2011 | Talley .................... | H04W 12/08 370/338 |
| 8,064,882 B2 | 11/2011 | Shatzkamer et al. | |
| 8,112,083 B1 | 2/2012 | Sigg et al. | |
| 8,131,318 B2 | 3/2012 | Montes | |
| 8,189,460 B2 | 5/2012 | Shaffer et al. | |
| 8,213,953 B1 | 7/2012 | Mangal | |
| 8,380,169 B2 | 2/2013 | Gogic | |
| 8,817,606 B2* | 8/2014 | Ye .................... | H04L 12/40032 370/229 |
| 8,929,884 B2* | 1/2015 | Takano ................. | H04W 48/06 370/235 |
| 9,055,511 B2 | 6/2015 | Gupta et al. | |
| 9,380,045 B2* | 6/2016 | Gilboy ................... | H04L 63/08 |
| 2002/0086679 A1 | 7/2002 | Li et al. | |
| 2002/0162008 A1* | 10/2002 | Hill ....................... | G06F 21/31 726/26 |
| 2002/0180614 A1 | 12/2002 | Gonzalez et al. | |
| 2002/0181501 A1 | 12/2002 | Nova et al. | |
| 2003/0027571 A1* | 2/2003 | Karlsson ............... | H04W 28/02 455/433 |
| 2003/0027580 A1 | 2/2003 | Goodjohn et al. | |
| 2003/0156700 A1 | 8/2003 | Brown et al. | |
| 2004/0088394 A1 | 5/2004 | Brinton et al. | |
| 2004/0147266 A1 | 7/2004 | Hwang et al. | |
| 2004/0162070 A1 | 8/2004 | Baral et al. | |
| 2004/0259528 A1 | 12/2004 | Gandhi et al. | |
| 2005/0122233 A1 | 6/2005 | Isoyama et al. | |
| 2006/0015354 A1 | 1/2006 | Shrum et al. | |
| 2006/0171350 A1* | 8/2006 | Taniguchi ........... | H04L 12/1417 370/328 |
| 2006/0294387 A1 | 12/2006 | McCracken et al. | |
| 2007/0142031 A1 | 6/2007 | Lee et al. | |
| 2007/0157292 A1 | 7/2007 | Danner et al. | |
| 2007/0169107 A1 | 7/2007 | Huttunen | |
| 2007/0195789 A1 | 8/2007 | Yao | |
| 2007/0207812 A1 | 9/2007 | Borran et al. | |
| 2007/0248060 A1 | 10/2007 | Mooney et al. | |
| 2007/0268908 A1 | 11/2007 | Linkola et al. | |
| 2007/0271598 A1* | 11/2007 | Chen ..................... | H04W 12/06 726/4 |
| 2008/0066125 A1* | 3/2008 | Li .......................... | H04N 7/165 725/97 |
| 2008/0075032 A1 | 3/2008 | Balachandran et al. | |
| 2008/0132207 A1 | 6/2008 | Gallagher et al. | |
| 2008/0162707 A1 | 7/2008 | Beck et al. | |
| 2008/0200146 A1* | 8/2008 | Wang .................. | H04J 11/0069 455/410 |
| 2008/0207178 A1 | 8/2008 | Tischer et al. | |
| 2008/0293429 A1* | 11/2008 | Harris .................... | H04L 47/10 455/453 |
| 2009/0141661 A1 | 6/2009 | Li et al. | |
| 2009/0165146 A1* | 6/2009 | Wenzlik ............. | G07C 9/00166 726/28 |
| 2009/0191857 A1 | 7/2009 | Horn et al. | |
| 2009/0191858 A1 | 7/2009 | Calisti et al. | |
| 2010/0014423 A1 | 1/2010 | Furuskar et al. | |
| 2010/0031334 A1 | 2/2010 | Shaikh | |
| 2010/0128681 A1 | 5/2010 | Breuer et al. | |
| 2010/0177663 A1 | 7/2010 | Johansson et al. | |
| 2010/0189066 A1* | 7/2010 | Tan ........................ | H04L 47/15 370/329 |
| 2001/0098020 | 4/2011 | Van Loon et al. | |
| 2011/0312308 A1 | 12/2011 | Willey | |
| 2013/0279617 A1 | 10/2013 | Xu et al. | |
| 2013/0304881 A1 | 11/2013 | Venkatraman et al. | |
| 2014/0317178 A1* | 10/2014 | Purpura .................. | H04L 63/10 709/203 |
| 2016/0277402 A1* | 9/2016 | Gilboy ..................... | H04L 63/08 |
| 2017/0201609 A1* | 7/2017 | Salmenkaita ........ | H04M 1/6041 |

FOREIGN PATENT DOCUMENTS

| | | |
|---|---|---|
| EP | 1032236 A1 | 8/2000 |
| EP | 1681815 A1 | 7/2006 |
| JP | H05-344211 A | 12/1993 |
| JP | H10-117243 A | 5/1998 |
| JP | H11-055176 A | 2/1999 |
| JP | 2004-072367 A | 3/2004 |
| WO | WO99/07167 | 2/1999 |
| WO | WO01/55861 | 8/2001 |
| WO | WO03/028310 | 4/2003 |
| WO | WO2005031544 A2 | 4/2005 |
| WO | WO2007127092 A2 | 11/2007 |

OTHER PUBLICATIONS

GEO-Mobile Radio Interface Specifications (Release 2) General Packet Radio Service; Part 4: Radio interface protocol specifications; Sub-part 8: Mobile Radio Interface Layer 3 Specifications; GMPRS-1 04.008; ETSI TS 101 376-0408 V2.3.1, Aug. 2008, 134 pages.
GEO-Mobile Radio Interface Specifications (Release 2) General Packet Radio Service; Part 3: Network specifications; Sub-part 3:

(56) References Cited

OTHER PUBLICATIONS

Numbering, addressing and identification; GMPRS-1 03.003; ETSI TS 101 376-03-03 V2.1.1, Mar. 2003, 17 pages.
GEO-Mobile Radio Interface Specifications (Release 2) General Packet Radio Service; Part 4: Radio interface protocol specifications; Sub-part 12: Mobile Earth Station (MES)—Base Station System (BSS) interface; Radio Link Control/Medium Access Control (RLC/MAC) protocol; GMPRS-1 04.060; ETSI TS 101 376-4-12 V2.1.1, Mar. 2003, 94 pages.
Japanese Office Action in Japanese Patent Application No. 2013-095150, dated Mar. 27, 2014.
Japanese Office Action in Japanese Patent Application No. 2013-130181, dated Apr. 23, 2014.
Office Action in U.S. Appl. No. 12/919,965 dated Jul. 9, 2014.
Office Action in U.S. Appl. No. 12/919,965 dated May 15, 2012.
Office Action in U.S. Appl. No. 12/919,965 dated Feb. 12, 2013.
Office Action in U.S. Appl. No. 12/919,965 dated Feb. 13, 2013.
PCT International Search Report and Written Opinion, PCT International Application No. PCT/EP2009/001214, dated Mar. 23, 2009.
Digital Cellular Telecommunications System (Phase 2+): Universal Mobile Telecommunications System (UMTS); Technical Realization of Operator Determined Barring (ODB) (3GPP TS 23.015 version 7.0.0 Release 7), ETSI TS 123 015, ETSI Standards, Lis, Sophia Antipolis cedex, France, vol. 3-CN2; 3-CN4, No. V7.0.0, Mar. 1, 2007.
European Search Report, European Patent Application No. 08003753.4 dated Aug. 19, 2008.
3rd Generation Partnership Project; Technical Specification Group Services and System Aspects; Study on Facilitating Machine to Machine Communication in 3GPP System; (Release 8), 3GPP Standard; 3GPP TR 22.868, 3rd Generation Partnership Project (3GPP), Mobile Competence Centre; 650, Route Des Lucioles; F-06921 Sophia-Antipolis Cedex; France, No. V8.0.0, Mar. 1, 2007.
ETSI TS 125 331 V5.21.0 (Jan. 2008); Technical Specification; "Universal Mobile Telecommunications System (UMTS); Radio Resource Control (RRC); Protocol Specification (3GPP TS 25.331 version 5.21.0 Release 5)" Jan. 2008.
"Improved Network Load Control for CELL/URA_PCH States", 3GPP TSG-RAN WG2 Meeting #57bis, St. Julian's, Malta, Mar. 26-30, 2007.
Dimitrios Miras, Network QoS Needs of Advanced Internet Applications, 2002, available at http://comp.ist.utl.pt/pdeec-qs/bibliografia/10-Internet2AppsQoSNeeds.pdf.
3GPP TS 22.368 V0.3.0: "Service requirements for Machine-Type Communications (MTC); Stage 1", Feb. 2009.
3GPP TS 23.060 V7.6.0: "3rd Generation Partnership Project; Technical Specification Group Services and System Aspects; General Packet Radio Service (GPRS); Service description; Stage 2 (Release 7)", Dec. 2007.
3GPP TS 23.015 V7.0.0: "Digital cellular telecommunications system (Phase 2+); Universal Mobile Telecommunications System (UMTS); Technical realization of Operator Determined Barring (ODB) (Release 7)", Mar. 2007.
Proceedings of Conference on NASA Centers for Commercial Development of Space, AIP SCITATION, http://scitation.aip.org/content/aip/proceeding/aipcp/325 (as of May 12, 2016) (descriptions of proceedings expanded).
Michel Mouly, and Marie-Bernadette Pautet, "The GSM system for mobile communications" (excerpts) 1992, ISBN 2-9507190-0-7.
"Mobile Radio Interface Layer 3 Specification (Release 92, Phase 1)" ETSI Recommendation GSM 04.08 v3.13.0 (Feb. 1992), ETSI prI-ETS 300 022 (Feb. 1992).

\* cited by examiner

TELECOMMUNICATIONS NETWORK AND METHOD FOR TIME-BASED NETWORK ACCESS

CROSS REFERENCE TO RELATED APPLICATIONS

The present application is a continuation of, and claims priority to, U.S. application Ser. No. 12/919,965, filed on Aug. 27, 2010, which is a national stage entry of, and claims priority to, PCT/EP2009/001214, filed on Feb. 19, 2009, which claims priority to European Patent Application EP 08003753.4, filed in the European Patent Office on Feb. 29, 2008, all three of which are hereby incorporated in their entirety herein by reference.

FIELD OF THE INVENTION

The invention relates to the field of telecommunications. In particular, the invention relates a telecommunications network and a method of permitting access to said telecommunications network.

BACKGROUND OF THE INVENTION

The past decades have seen an ever increasing demand for data capacity of telecommunications network. Telecommunications providers have adapted their networks to provide extended GSM services, like GPRS, and 3G services and are continuing to provide further services to meet the demands of their clients.

Telecommunications providers have made attempts to influence the behaviour of their clients in order to efficiently use network resources. As an example, mobile data subscriptions nowadays are usually offered using volume based billing, possibly in combination with a volume cap, thereby forcing clients to consider the amount of data to be transmitted over a network. However, the control of the client behaviour and/or terminal data transmission and, therefore, the use of the network resources is still limited.

There is a need in the art for an improved telecommunications network and method for regulating the use of network resources.

SUMMARY OF THE INVENTION

A telecommunications network configured for providing communication access to a plurality of terminals is proposed. Each terminal comprises a unique identifier for accessing the telecommunications network. The unique identifier is preferably associated with a subscription of the terminal, e.g. the identifier of a SIM (IMSI) that is available in the terminal. The telecommunications network comprises a register, an access request receiver and an access module. The register is configured for storing the unique identifier of at least one terminal in combination with at least one grant access time interval, or an equivalent thereof, during which access for the terminal is permitted. The access request receiver is configured for receiving the access request for accessing the telecommunications network from the terminal. The access request may contain the unique identifier or a temporary identifier. The access module is configured for denying access for the terminal if the access request is received outside the access time interval, or the equivalent thereof.

A register and a serving controlling entity for use in such a network are also proposed.

A computer-implemented method of controlling access to a telecommunications network is also proposed. The telecommunications network is configured for allowing access for a plurality of terminals, each terminal comprising a unique identifier for accessing the telecommunications network. The telecommunications network comprises a register configured for storing the unique identifier of at least one terminal in combination with at least one grant access time interval, or an equivalent thereof. An access request is received from the terminal for access to the telecommunications network. The access request may contain the unique identifier or a temporary identifier. In a further step, the grant access time interval for the terminal is verified, using the unique identifier. Access to the telecommunications network for said terminal is denied if the access request is received outside the time interval.

A computer program and a carrier for such a computer program comprising program code portions configured for executing the method are also proposed.

A terminal for use in the system and method is also proposed.

It should be appreciated that an equivalent of the grant access time interval includes a deny access time interval identifying a time interval during which an access request for access to the telecommunications network is to be denied.

The access request may be a circuit-switched access request, a packet-switched access request or a combined request.

The steps of accessing a telecommunications network are standardized in e.g. 3 GGP TS 23.060 (Release 7). It should be appreciated that the access to the telecommunications network can be denied at various access phases. The first phase of requesting network access typically involves a network attach procedure comprising several steps. Preferably, access to the telecommunications network is denied by denying network attach of the terminal. Denying at this phase provides for optimized saving of resources.

A further network access phase involves the establishment of a PDP context. Establishment of the PDP context may be denied. Although the preceding network attach already involved the use of network resources, prohibiting the establishment of a PDP context prevents effective use of the telecommunications network and hence saves resources. It should be noted that operator determined barring (ODS) as such for access to a telecommunications network is already described in 3GGP TS 23.015, V. 7.0.0. The barring possibility allows network operators to deny access to particular destinations for certain subscribers.

By providing the option of specifying one or more time intervals during which access to the telecommunications network is allowed for a particular terminal or group of terminals, the network operator planning and control of the use of network resources is facilitated. Denying or blocking access during time intervals can prove advantageous in various situations. In particular, some machine-to-machine (M2M) applications do not require the transfer of data to be immediate. If these applications are prevented from claiming one or more network resources during e.g. peak load hours, network resources can be saved. Such subscriptions may e.g. be offered at a lower subscription rate.

M2M applications typically involve hundreds or thousands of devices that only rarely require access to a telecommunications network. An example involves the electronic reading of e.g. electricity meters at the homes of a large customer base.

The embodiments of claims 2 and 13 provide for a suitable place in the telecommunications network for making available the combinations of terminal identifier(s) and associated time interval(s).

The embodiments of claims 3 and 14 provide for a dynamic time interval (and possibly a virtual or implicit time interval) during which access to the telecommunications network is allowed/prohibited. These embodiments contribute to the optimum use of network resources.

The embodiments of claims 4 and 15 provide for an improved use of network resources.

The embodiments of claims 5 and 16 provide for an improved use of network resources.

The embodiments of claims 6 and 17 provides the option to inform the terminal of the grant access time interval. Such information should only be transmitted to the terminal in question. Moreover, only allowing single authentication saves network resources and saves power for the terminals.

The embodiments of claims 7 and 18 ensure that the decision whether or not to allow access (either network attach or establishment of the PDP context) to the telecommunications network is embedded at a low level of the telecommunications network, e.g. at the SGSN, reducing network resource consumption. Other solutions, such as the implementation of grant access time rules in a RADIUS server, would require several network functions, mobility management and setting up a packet data protocol (PDP) context, and, thereby, unnecessarily consume network resources in case it would be determined that the terminal accessed the telecommunications network outside the grant access time interval.

The embodiments of claims 8 and 19 allow the transmission of information to the terminal. Such information may include information concerning the applicable grant access time interval. Possibly, the information may include control information for controlling terminal operation. The control information may e.g. control the terminal to log in during a time interval wherein the network load is expected to be low. An authentication procedure is preferably performed for this terminal.

The embodiments of claims 9 and 20 provide for higher level authentication, e.g. at a GGSN, during the grant access time interval.

Hereinafter, embodiments of the invention will be described in further detail. It should be appreciated, however, that these embodiments may not be construed as limiting the scope of protection for the present invention.

DETAILED DESCRIPTION OF THE DRAWINGS

Figure 1:
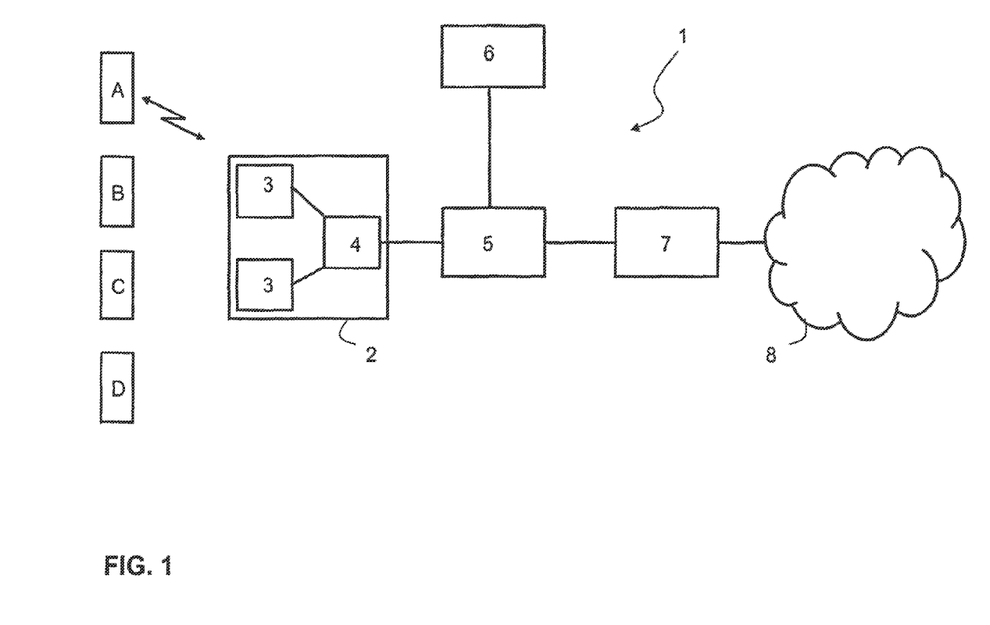
FIG. 1 shows a schematic illustration of a telecommunications network according to an embodiment of the present invention.

FIG. 1 shows a schematic illustration of a packet service telecommunications network 1 in combination with a plurality of terminals A-D that may access the telecommunications network 1 for data communication.

The telecommunications network 1 comprises a radio access network 2 containing a base transceiver station 3 and a base station controller 4. The radio access network is connected to a mobile core network containing a serving controller entity 5, a register 6 and a gateway 7 providing access to a further network 8.

The serving controller entity 5 may be a serving GPRS support node (SGSN) or another entity. The SGSN 5 controls the connection between the telecommunications network 1 and the terminals A-D. It should be appreciated that the telecommunications network may contain a plurality of SGSNs, wherein each of the SGSNs is connected typically to base station controllers 3 in such a way that they can provide a packet service for terminals via several base stations 3.

The register 6 may be a home location register (HLR) or another register (such as a home subscriber server for IMS).

The gateway 7 may be a GPRS gateway support node (GGSN) to e.g. the internet. Other external networks include a corporate network or another network of the operator. The GGSN 7 is connected to the SGSN 5 via a core network.

Access for the terminals A-D to the telecommunications network 1 involves a number of access phases.

The first phase involves the phase during which a terminal A-D performs an attach to the telecommunications network 1. In this phase, various communication steps are performed, including authentication steps, as exemplified in 3GGP TS 23.060 (Release 7). The authentication steps perform a security function and involve exchange of an authentication triplet (for GPRS) or quintet (for UMTS).

In a subsequent phase, a packet data protocol (PDP) context, may be established to carry traffic flows over the telecommunications network 1. A PDP context typically includes a radio access bearer provided between a terminal A and the SGSN 5 and switched packet data channels or tunnels provided between the SGSN 5 and the GGSN 7. A session between the terminal A and another party would then be carried on the established PDP context. A PDP context can carry more than one traffic flow, but all traffic flows within one particular PDP context are treated the same way as regards their transmission across the telecommunications network 1.

In operation, the terminal A may indicate after the network attach phase, in a message requesting to activate the PDP context in the network, an access point name (APN) for selection of a reference point to a certain external network 8. The SGSN 5 may send a PDP context creation request to the GGSN 7 selected e.g. according to the access point name given by the terminal A or to a default GGSN known by the SGSN 5. Subsequently, the PDP context is activated by allocating a PDP context data structure in the SGSN 5 that is used by the terminal A and the GGSN 7 serving the subscribers access point. The data structure contains an IP address of the terminal A, the IMSI of the terminal A and tunnel ID's at both the SGSN 5 and the GGSN 7. The tunnel ID is a number allocated by the GGSN 7 which identifies the data related to a particular PDP context.

Various features can be controlled by the SGSN 5 during a communication session. This control may be based on information associated with the subscription and stored in the HLR 6. The information may be retrieved from the HLR 6 to the SGSN 5 to allow control at the SGSN-level.

Figure 2:
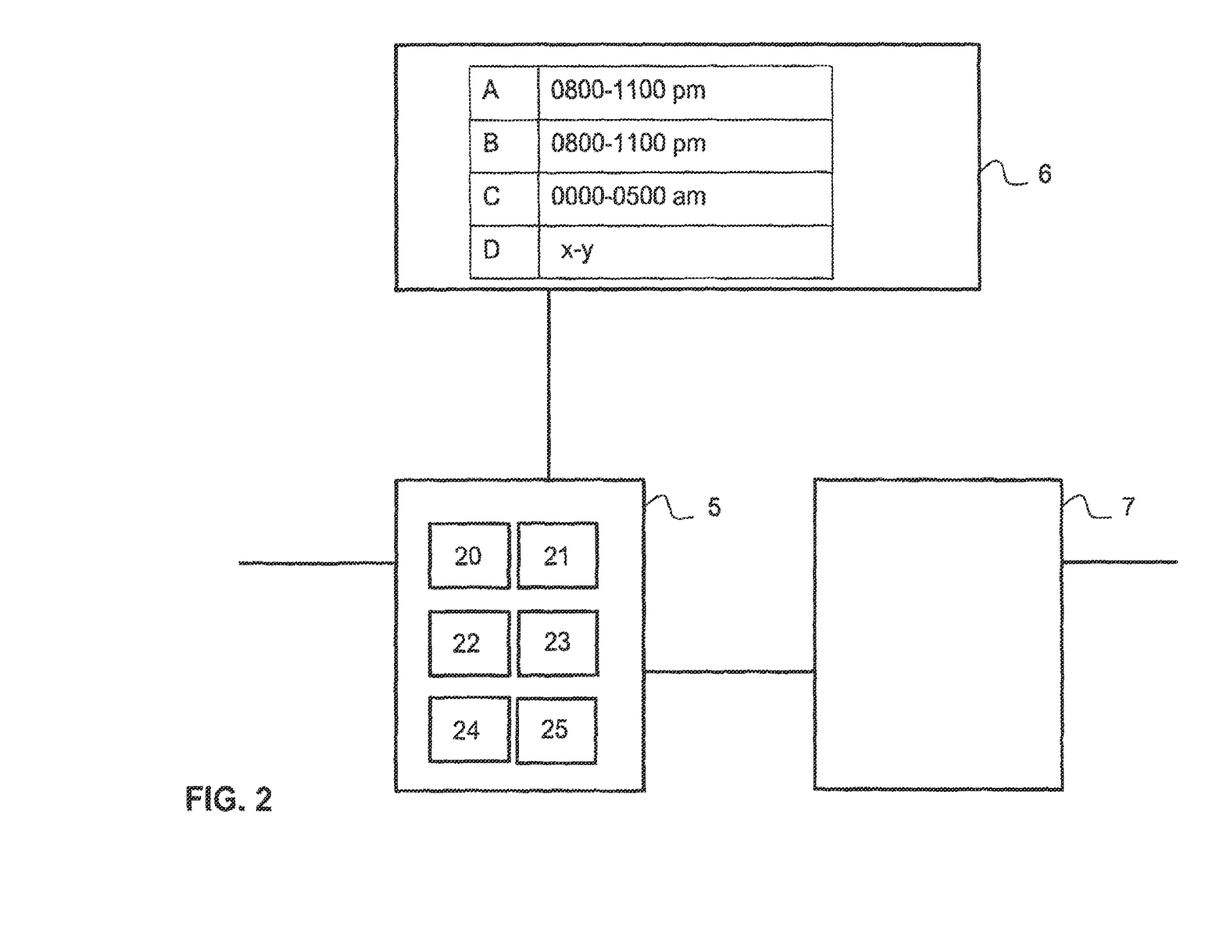
FIG. 2 shows a HLR, a SGSN and a GGSN of the telecommunications network of FIG. 1.

In particular, and with reference now to FIG. 2, the HLR 6 contains a unique identifier associated with the subscription for each terminal A-D, e.g. the IMSI stored in the SIM of the terminal A-D. Each terminal A-D has been assigned a time interval during which access to the telecommunications network 1 will be granted.

In this example, for terminals A and B, access will be granted between 0800-1100 pm. For terminal C, access will be granted between 0000-0500 am. These time intervals are typically off-peak intervals for most days of the year. Batches of terminals may be defined and assigned a particular interval of the off-peak hours. For terminal D, a variable time interval x-y is scheduled, depending on the network load experienced by or expected for the telecommunications network 1. If the network load drops below or is expected to drop below a particular threshold, access is granted to the terminal D.

Of course, the time intervals may also relate to time slots during which access to the telecommunications network 1 is denied, i.e. access deny time intervals. Multiple time intervals may be assigned to a terminal.

In order to control the use of resources of the telecommunications network 1, the SGSN 5 contains several modules for performing the operations described below in further detail. It should be noted that one or more of these modules may be implemented as software modules running on a processor (not shown). The SGSN 5 further contains memory and storage (not shown) for performing these operations in a manner generally known to the skilled person.

The SGSN 5 comprises an access request receiver 20 configured for receiving an access request from the terminals A-D for access to the telecommunications network 1. The access request of a terminal contains the IMSI of the SIM available in this terminal.

The SGSN 5 has an access module 21 configured for denying access for a terminal to the telecommunications network 1 if the access request is received outside the grant access time interval(s) for that terminal (or within the access deny interval). The access denial may relate to the network attach or the establishment of the PDP context.

Moreover, the SGSN 5 comprises a data retrieval module 22. The data retrieval module 22 is configured for retrieving data from the HLR 6, in particular the applicable access grant time interval associated with the terminals A-D from which the access request was received. However, it should be appreciated that the SGSN 5 itself may be pre-configured with respect to particular terminals and therefore already comprise the grant access time interval(s) for these terminals. This may be particularly advantageous for stationary terminals.

The SGSN 5 also comprises a PDP context establishing module 23 and an authenticator 24.

SGSN 5 may also have a network load monitor 25 configured for monitoring the network load of the telecommunications network 1. Network load information may also be obtained from other sources, e.g. other SGSNs or the HLR of the telecommunications network 1. Network monitoring may be real time and/or be based on the expected network load using mathematical models and history data to obtain an appropriate load expectation.

The operation of the telecommunications network 1, and in particular the SGSN 5, will now be described with reference to FIGS. 3A-3D.

Figure 3A:
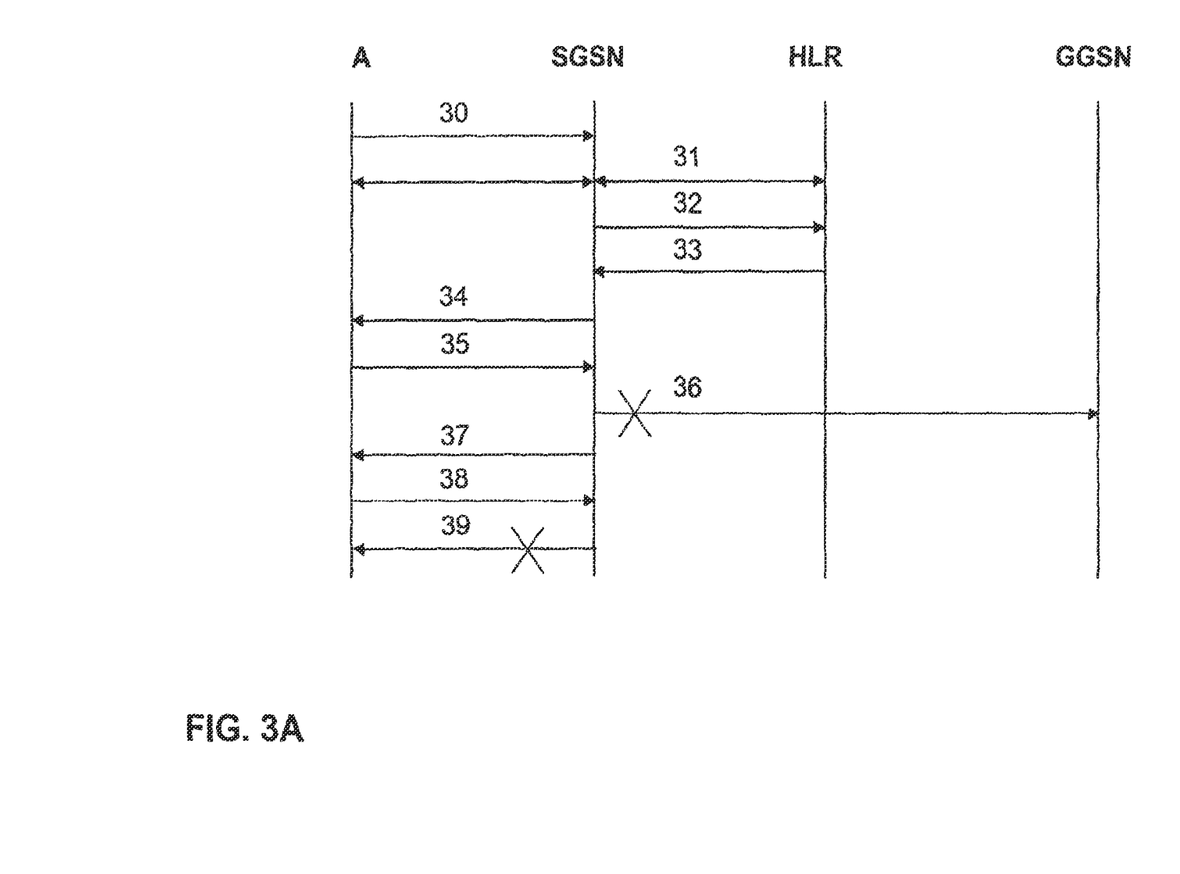
FIGS. 3A-3D show various time diagrams of methods for using the telecommunications system of FIG. 1.

In FIG. 3A, the access request receiver 20 of the SGSN receives an attach request from terminal A at 0700 pm in step 30. To be able to process this attach request, the SGSN needs the IMSI of the SIM available in the terminal. The attach request may contain either this IMSI or a P-TMSI assigned to terminal A by an SGSN. The P-TMSI is used to prevent transmission of the IMSI over the radio path as much as possible for security reasons. If the P-TMSI provided by terminal A is known in the SGSN, the SGSN is able to derive the IMSI. Alternatively, for a P-TMSI provided by terminal A that is not known by the (new) SGSN, the IMSI is provided either by the old SGSN or the terminal itself on request of the new SGSN. The IMSI is used by data retrieval module 22 to retrieve the grant access time interval (0800-1100 pm) from the HLR 6 to the SGSN 5 in step 31.

The grant access time interval may be communicated from the HLR 6 to the SGSN 5 in a variety of ways.

The attach request 30 is typically followed by an authentication check, step 31. The grant access time interval may be transmitted to the SGSN 5 with the authentication triplet or quintet.

The authentication procedure of the network attach phase is typically followed by a location update procedure. First an update location request 32 is transmitted from the SGSN 5 to the HLR 6. The grant access time interval may also be transmitted to the SGSN 5 in a subsequent Insert Subscriber Data message from HLR 6 (step 33). The network attach phase is finalized with an attach accept message to the terminal A (step 34).

After finalizing the network attach phase (which may comprise further steps than mentioned in the previous paragraphs), a PDP context is established. The terminal A requests establishment of the PDP context in an activate PDP context request 35.

Irrespective of the manner of obtaining the grant access time interval, the access module of SGSN 5 determines that the access request was received outside the grant access time interval. Consequently, a PDP context is not established (indicated by the cross in step 36). The terminal A is informed of the denial in step 37.

It is noted that the authenticator 24 of SGSN 5 may or may not have authenticated terminal A in the above situation. Authentication is required if the grant access time interval is transmitted from the HLR 6 to SGSN 5 in response to the update location message 32. However, authentication should not be completed if the grant access time interval is obtained in SGSN with the authentication triplet/quintet. Authentication is preferred if the denial message 37 to the terminal A contains information concerning the grant access time interval.

The SGSN 5 comprises or obtains and maintains the data of the failed access request. This may e.g. be done by storing the time interval in combination with the IMSI of terminal A or by flagging the terminal A temporarily in combination with some time indication.

Another access request at a time outside the window 0800-1100 pm (step 38), again containing or followed by the IMSI of terminal A, may then be denied directly (step 39). Authentication will not be performed again.

Figure 3B:
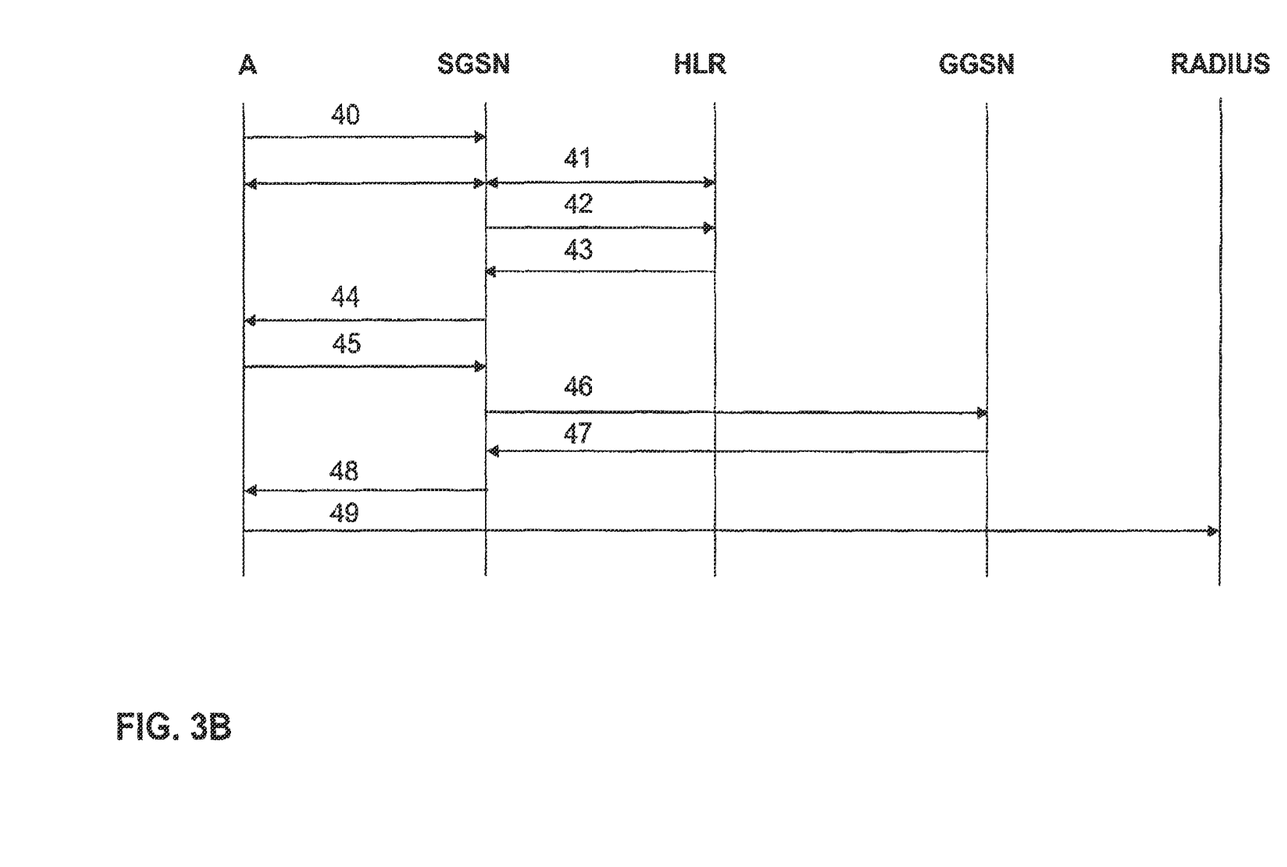

In FIG. 3B, the network attach of terminal A is received at 0900 pm. Steps 40-45 correspond to steps 30-35. Since the network attach request is now within the time interval allocated for access for the terminal A, access module 21 controls the PDP context establishing module 23 of the SGSN 5 to establish a PDP context with the terminal A and to establish a PDP tunnel with the GGSN 7. In particular, step 46 involves a Create PDP Context Request and step 47 a Create PDP Context Response in a manner known as such. In step 48, the terminal A is informed by a Activate PDP Context Accept message. The terminal A may now follow another authentication procedure (step 49), using e.g. a RADIUS server in the further network 8.

The network load monitoring module 25 of SGSN 5 may monitor the network load of (a part of) the telecommunications network 1 or output an expected network load. The network load may be compared with a load threshold in order to evaluate the existence of a low network load situation at a particular time or time interval.

Figure 3C:
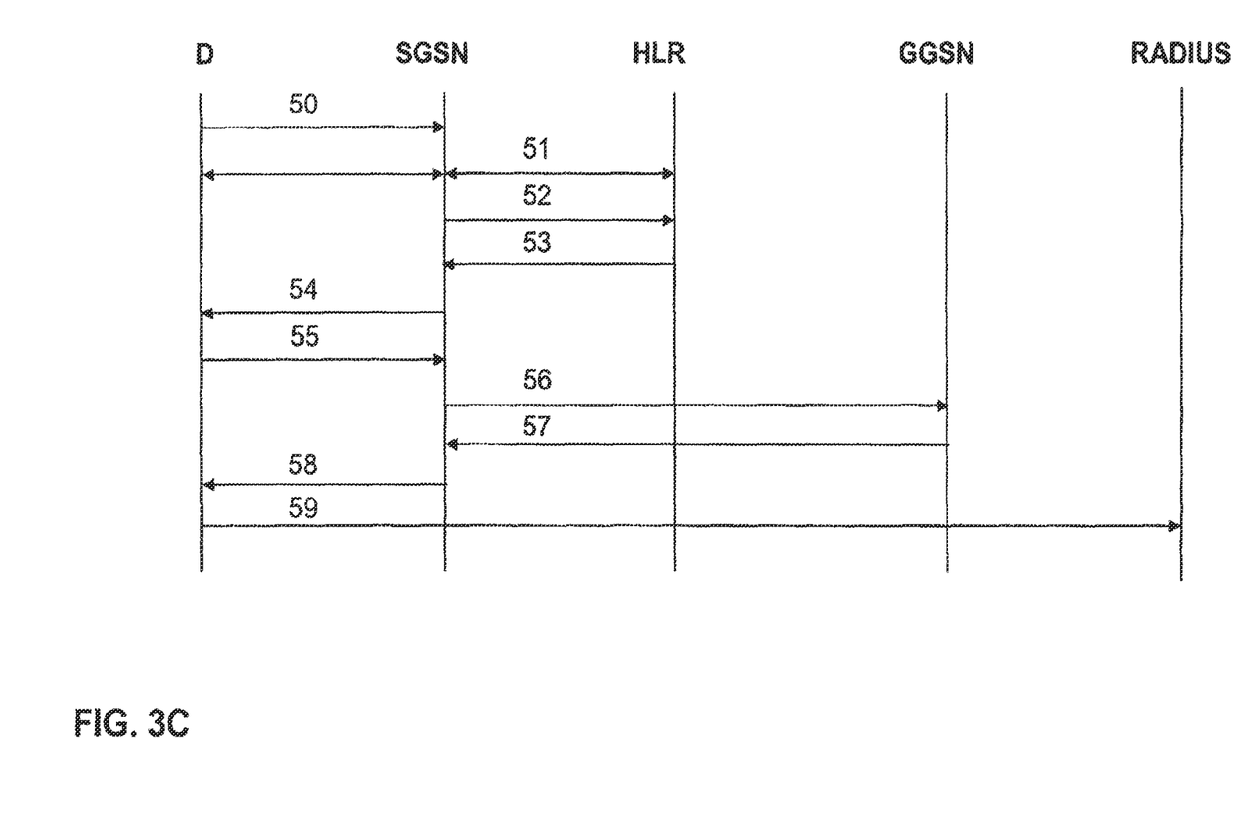

In FIG. 3C, steps 50-53 correspond to steps 30-33 of FIG. 3A. Authentication of terminal D is performed and in step 54, the terminal D is informed of a time interval x-y during which a low network load is expected. The information includes control information to control terminal D such that it accesses the telecommunications network 1 again (step 55) in such a low network load time interval. A PDP context can be set up immediately (steps 56-58) and access to the RADIUS server is allowed.

Figure 3D:
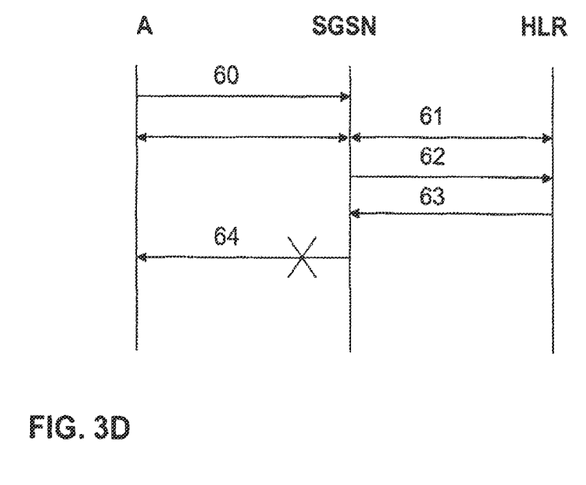

As mentioned above, the denial of access to the telecommunications network 1 is preferably performed during the network attach. FIG. 3D shows in step 60 a network attach message of terminal A containing an IMSI. Then an authentication procedure is performed (step 61) during which the grant access time interval is received at SGSN 5. The grant access time interval and the IMSI is stored at SGSN 5. Alternatively, the grant access time interval is obtained in the location update procedure (steps 62 and 63). The network attach is denied in step 64.

As mentioned before, SGSN 5 may itself comprise pre-configured information regarding the grant access time interval for terminal A. Alternatively, the SGSN uses authenticator 24 to authenticate terminal A and to provide terminal A with information regarding the grant access time interval in step 61.

Figure 4:
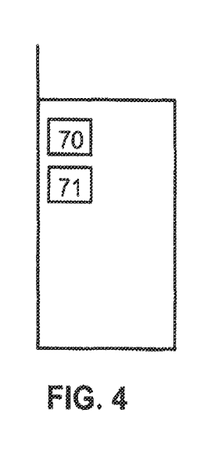
FIG. 4 shows a schematic illustration of a terminal for use with the telecommunications network of FIG. 1.

FIG. 4 shows a schematic illustration of terminal A. The terminal A comprises a transceiver module 70 for communicating with the telecommunications network 1. The terminal A further has an access request module 71. The access request module is configured for receiving information regarding the grant access time interval from the telecommunications network 1 via the transceiver module 70 and to transmit an access request to the telecommunications network only at a time within the grant access time interval.

It should be noted that the above described telecommunications network and system are especially suitable for saving resources. There may be other approaches to influence access behaviour of terminals but these are considered to waste more resources.

As an example, a network provider may allow access to the network at all times but charge a (very) high rate for data sent outside the off-peak time. This provides no incentive for the user to tear down the connection (i.e. the PDP context) to the network. It only provides an incentive to not send data during the expensive peak hour. However, an active PDP context still consumes a lot of resources in the mobile radio and core network as well as requiring an IP address. It also requires the terminal being attached to the network, meaning all kinds of mobility management features should be in place. Furthermore, this solution requires a more complicated billing system that allows charging higher rates at certain times.

Another example would include blocking access to the terminal during peak hours as a rule in a RADIUS server. However, network resources would already be consumed before access is blocked by the RADIUS server. The terminal is already allowed to attach to the network, meaning the SGSN would have retrieved information from the HLR, and is performing mobility management functions. Also, the terminal has been allowed to establish a PDP context. If the RADIUS server would reject the request for access to the external data network, the GGSN would not accept the PDP context, and the tunnel would be taken down. Attachment to the network will however continue if no additional measures were taken.

The invention claimed is:

1. A telecommunications network configured for providing access to a plurality of terminals, each terminal of the plurality comprising a unique identifier for accessing the telecommunications network, wherein the telecommunications network comprises:
    a register configured for storing the unique identifier of at least one terminal in combination with at least one grant access time interval, outside of which requesting access to additional resources of the telecommunications network for the at least one terminal is not permitted;
    a serving controller entity configured for transmitting access grant information, including a specification of the at least one grant access time interval, to the at least one terminal, wherein the at least one terminal is configured to transmit an access request for accessing the additional resources of the telecommunications network to the telecommunications network in accordance with the at least one grant access time interval included in the access grant information transmitted by the serving controller;
    one or more processors; and
    memory storing processor instructions that, when executed by the one or more processors, cause the one or more processors to carry out operations including:
    an access request operation to receive an access request for accessing the additional resources of the telecommunications network from the at least one terminal and to determine the unique identifier associated with the at least one terminal;
    wherein different groups of the terminals are defined, each terminal of which operates one or more machine-to-machine applications not requiring immediate transfer of data,
    and wherein the grant access time interval for the terminals of at least one of the different groups of terminals is a variable time interval x-y that is scheduled depending on a network load experienced by, or expected for, the telecommunications network, and the terminals of the at least one of the different groups of terminals transmit an access request for accessing the additional resources of the telecommunications network to the telecommunications network in accordance with the variable time interval x-y included in the access grant information transmitted by the serving controller.

2. The telecommunications network of claim 1, wherein the serving controller entity comprises the one or more processors and memory, and wherein the serving controller is further configured for planning and controlling use of the telecommunications network resources.

3. The telecommunications network of claim 2, wherein the serving controller entity is a serving general packet radio service support node.

4. The telecommunications network of claim 1, wherein the telecommunications network is further configured for obtaining and for monitoring the network load of the telecommunications network, and wherein the telecommunications network is further configured for adapting the grant access time interval based at least in part on the network load.

5. The telecommunications network of claim 1 wherein, the network load of the telecommunications network is monitored by at least one of (i) real-time monitoring, or (ii)

monitoring based on an expected network load and using mathematical models and history data.

6. The telecommunications network of claim 1, wherein a class of applications that do not require immediate transfer of data are executed,
and wherein terminals that execute the class of applications are not permitted to request access to the additional resources of the telecommunications network during peak load periods by having grant access time intervals that are outside the peak load periods.

7. The telecommunications network of claim 1, wherein the telecommunications network further comprises a cellular network, and the register is one of a home location register or a home subscriber server of the cellular telecommunications network.

8. The telecommunications network of claim 1,
wherein the serving controller entity comprises the one or more processors and memory,
wherein the operations further include a data retrieval operation for retrieving the grant access time interval from the register in response to receiving the access request for accessing the additional resources of the telecommunications network,
and wherein the operations further include an access operation for denying a network attach to the telecommunications network or denying establishing a packet data protocol context with the at least one terminal if the access request for accessing the additional resources of the telecommunications network is received outside the retrieved grant access time interval.

9. The telecommunications network of claim 1, wherein the serving controller entity is further configured for transmitting access grant information to the at least one terminal in response to the access request operation to receive an access request for accessing the additional resources of the telecommunications network from the at least one terminal.

10. The telecommunications network of claim 1, further comprising a gateway to a further network, the gateway being configured for allowing authentication of the at least one terminal.

11. A register configured for use in a telecommunications network, wherein the telecommunications network is configured for providing access to a plurality of terminals, each terminal of the plurality comprising a unique identifier for accessing the telecommunications network,
and wherein the register is further configured to store the unique identifier of at least one terminal in combination with at least one grant access time interval, outside of which requesting access to additional resources of the telecommunications network for the at least one terminal is not permitted,
wherein the telecommunications network includes:
a serving controller entity configured for transmitting access grant information, including a specification of the at least one grant access time interval, to the at least one terminal, wherein the at least one terminal is configured to transmit an access request for accessing the additional resources of the telecommunications network to the telecommunications network in accordance with the at least one grant access time interval included in the access grant information transmitted by the serving controller;
one or more processors; and
memory storing processor instructions that, when executed by the one or more processors, cause the one or more processors to carry out operations including:
an access request operation to receive an access request for accessing the additional resources of the telecommunications network from the at least one terminal and to determine the unique identifier associated with the at least one terminal;
wherein different groups of the terminals are defined, each terminal of which operates one or more machine-to-machine applications not requiring immediate transfer of data,
and wherein the grant access time interval for the terminals of at least one of the different groups of terminals is a variable time interval x-y that is scheduled depending on a network load experienced by, or expected for, the telecommunications network, and the terminals of the at least one of the different groups of terminals transmit an access request for accessing the additional resources of the telecommunications network to the telecommunications network in accordance with the variable time interval x-y included in the access grant information transmitted by the serving controller.

12. A serving controller entity configured for use in a telecommunications network, wherein the telecommunications network is configured for providing access to a plurality of terminals, each terminal of the plurality comprising a unique identifier for accessing the telecommunications network,
wherein the telecommunications network includes a register configured for storing the unique identifier of at least one terminal in combination with at least one grant access time interval, outside of which requesting access to additional resources of the telecommunications network for the at least one terminal is not permitted,
wherein the serving controller entity comprises:
one or more processors; and
memory storing processor instructions that, when executed by the one or more processors, cause the one or more processors to carry out operations including:
an access request operation to receive an access request for accessing the additional resources of the telecommunications network from the at least one terminal and to determine the unique identifier associated with the at least one terminal;
wherein the serving controller entity is further configured for transmitting access grant information, including a specification of the at least one grant access time interval, to the at least one terminal, wherein the at least one terminal is configured to transmit an access request for accessing the additional resources of the telecommunications network to the telecommunications network in accordance with the at least one grant access time interval included in the access grant information transmitted by the serving controller,
wherein different groups of the terminals are defined, each terminal of which operates one or more machine-to-machine applications not requiring immediate transfer of data,
and wherein the grant access time interval for the terminals of at least one of the different groups of terminals is a variable time interval x-y that is scheduled depending on a network load experienced by, or expected for, the telecommunications network, and the terminals of the at least one of the different groups of terminals transmit an access request for accessing the additional resources of the telecommunications network to the telecommunications network in accordance with the variable time interval x-y included in the access grant information transmitted by the serving controller.

13. A telecommunications network configured for providing access to a plurality of terminals, each terminal of the plurality comprising a unique identifier for accessing the telecommunications network, wherein the telecommunications network comprises:

a register configured for storing the unique identifier of at least one terminal in combination with at least one deny access time interval, during which requesting access to additional resources of the telecommunications network for the at least one terminal is not permitted;

a serving controller entity configured for transmitting access denial information, including a specification of the at least one deny access time interval, to the at least one terminal, wherein the at least one terminal is configured to transmit an access request for accessing the additional resources of the telecommunications network to the telecommunications network in accordance with the at least one deny access time interval included in the access denial information transmitted by the serving controller;

one or more processors; and memory storing processor instructions that, when executed by the one or more processors, cause the one or more processors to carry out operations including:

an access request operation to receive an access request for accessing the additional resources of the telecommunications network from the at least one terminal and to determine the unique identifier associated with the at least one terminal;

wherein different groups of the terminals are defined, each terminal of which operates one or more machine-to-machine applications not requiring immediate transfer of data, and wherein the deny access time interval for the terminals of at least one of the different groups of terminals is a variable time interval x-y that is scheduled depending on a network load experienced by, or expected for, the telecommunications network, and the terminals of the at least one of the different groups of terminals transmit an access request for accessing the additional resources of the telecommunications network to the telecommunications network in accordance with the variable time interval x-y included in the access denial information transmitted by the serving controller.

14. The telecommunications network of claim 13, wherein the serving controller entity comprises the one or more processors and memory, and wherein the serving controller entity is further configured for planning and controlling use of the telecommunications network resources.

15. The telecommunications network of claim 14, wherein the serving controller entity is a serving general packet radio service support node.

16. The telecommunications network of claim 13, wherein the telecommunications network is further configured for obtaining and for monitoring the network load of the telecommunications network, and wherein the telecommunications network is further configured for adapting the deny access time interval based at least in part on the network load.

17. The telecommunications network of claim 13 wherein, the network load of the telecommunications network is monitored by at least one of (i) real-time monitoring, or (ii) monitoring based on an expected network load and using mathematical models and history data.

18. The telecommunications network of claim 13, wherein a class of applications that do not require immediate transfer of data are executed, and wherein terminals that execute the class of applications are not permitted to request access to the additional resources of the telecommunications network during peak load periods by having deny access time intervals that are within the peak load periods.

19. The telecommunications network of claim 13, wherein the telecommunications network further comprises a cellular network, and the register is one of a home location register or a home subscriber server of the cellular telecommunications network.

20. The telecommunications network of claim 13, wherein the serving controller entity comprises the one or more processors and memory, wherein the operations further include a data retrieval operation for retrieving the deny access time interval from the register in response to receiving the access request for accessing the additional resources of the telecommunications network, and wherein the operations further include an access operation for denying a network attach to the telecommunications network or denying establishing a packet data protocol context with the at least one terminal if the access request for accessing the additional resources of the telecommunications network is received within the retrieved deny access time interval.

21. The telecommunications network of claim 13, wherein the serving controller entity is further configured for transmitting access denial information to the at least one terminal in response to the access request operation to receive an access request for accessing the additional resources of the telecommunications network from the at least one terminal.

22. The telecommunications network of claim 13, further comprising a gateway to a further network, the gateway being configured for allowing authentication of the at least one terminal.

23. The telecommunications network of claim 13 wherein the operations further include an access operation for denying access to the additional resources of the telecommunications network for the at least one terminal if the access request for accessing the additional resources of the telecommunications network is received within the deny access time interval.

24. A computer-implemented method of controlling access to a telecommunications network, the telecommunications network being configured for providing access to a plurality of terminals, each terminal of the plurality comprising a unique identifier for accessing the telecommunications network, and the telecommunications network comprising a register configured for storing the unique identifier of at least one terminal in combination with at least one grant access time interval, outside of which requesting access to additional resources of the telecommunications network for the at least one terminal is not permitted, the method comprising:

receiving at an access receiver an access request from at least one terminal for accessing the additional resources of the telecommunications network and determining the unique identifier associated with the at least one terminal; and transmitting from a serving controller entity access grant information, including a specification of the at least one grant access time interval, to the at least one terminal, wherein the at least one terminal is configured to transmit an access request for accessing the additional resources of the telecommunications network to the telecommunications network in accordance with the at least one grant access time interval included in the access grant information transmitted from the serving controller entity, wherein different groups of the terminals are defined, each terminal of which operates one or more machine-to-machine applications not requiring immediate transfer of data, and wherein the grant access time interval for the terminals of at least one of the different groups of terminals is a variable time interval x-y that is scheduled depending on a network load experienced by, or expected for, the telecommunications network, and the terminals of the at least one of the different groups of terminals transmit an access request for accessing the additional resources of the telecommunications network to the telecommunications network in accordance with the variable time interval x-y included in the access grant information transmitted by the serving controller.

25. The method of claim 24, wherein a class of applications that do not require immediate transfer of data are executed, and wherein terminals that execute the class of applications are not permitted to request access to the additional resources of the telecommunications network during peak load periods by having grant access time intervals that are outside the peak load periods.

26. A computer-implemented method of controlling access to a telecommunications network, the telecommunications network being configured for providing access to a plurality of terminals, each terminal of the plurality comprising a unique identifier for accessing the telecommunications network, and the telecommunications network including a register configured for storing the unique identifier of at least one terminal in combination with at least one deny access time interval, during which requesting access to additional resources of the telecommunications network for the at least one terminal is not permitted, the method comprising:

receiving at an access receiver an access request from at least one terminal for accessing the additional resources of the telecommunications network and determining the unique identifier associated with the at least one terminal; and transmitting from a serving controller entity access denial information, including a specification of the at least one deny access time interval, to the at least one terminal, wherein the at least one terminal is configured to transmit an access request for accessing the additional resources of the telecommunications network to the telecommunications network in accordance with the at least one deny access time interval included in the access denial information transmitted from the serving controller entity, wherein different groups of the terminals are defined, each terminal of which operates one or more machine-to-machine applications not requiring immediate transfer of data, and wherein the deny access time interval for the terminals of at least one of the different groups of terminals is a variable time interval x-y that is scheduled depending on a network load experienced by, or expected for, the telecommunications network, and the terminals of the at least one of the different groups of terminals transmit an access request for accessing the additional resources of the telecommunications network to the telecommunications network in accordance with the variable time interval x-y included in the access denial information transmitted by the serving controller.

27. A non-transitory computer-readable medium having instructions stored thereon that, when executed by one or more processors of a telecommunications network configured for providing access to a plurality of terminals that each comprise a unique identifier for accessing the telecommunications network, wherein the telecommunications network includes a register configured for storing the unique identifier of at least one terminal in combination with at least one grant access time interval, outside of which requesting access to additional resources of the telecommunications network for the at least one terminal is not permitted, cause the telecommunications network to carry out operations including:

receiving an access request from at least one terminal for accessing the additional resources of the telecommunications network and determining the unique identifier associated with the at least one terminal; and transmitting access grant information, including a specification of the at least one grant access time interval, to the at least one terminal, wherein the at least one terminal is configured to transmit an access request for accessing the additional resources of the telecommunications network to the telecommunications network in accordance with the at least one grant access time interval included in the access grant information transmitted, wherein different groups of the terminals are defined, each terminal of which operates one or more machine-to-machine applications not requiring immediate transfer of data, and wherein the grant access time interval for the terminals of at least one of the different groups of terminals is a variable time interval x-y that is scheduled depending on a network load experienced by, or expected for, the telecommunications network, and the terminals of the at least one of the different groups of terminals transmit an access request for accessing the additional resources of the telecommunications network to the telecommunications network in accordance with the variable time interval x-y included in the transmitted access grant information.

28. A non-transitory computer-readable medium having instructions stored thereon that, when executed by one or more processors of a telecommunications network configured for providing access to a plurality of terminals that each comprise a unique identifier for accessing the telecommunications network, wherein the telecommunications network includes a register configured for storing the unique identifier of at least one terminal in combination with at least one deny access time interval, during which requesting access to additional resources of the telecommunications network for the at least one terminal is not permitted, cause the telecommunications network to carry out operations including:

receiving an access request from at least one terminal for accessing the additional resources of the telecommunications network and determining the unique identifier associated with the at least one terminal; and transmitting access denial information, including a specification of the at least one deny access time interval, to the at least one terminal, wherein the at least one terminal is configured to transmit an access request for accessing the additional resources of the telecommunications network to the telecommunications network in accordance with the at least one deny access time interval included in the access denial information transmitted, wherein different groups of the terminals are defined, each terminal of which operates one or more machine-to-machine applications not requiring immediate transfer of data, and wherein the deny access time interval for the terminals of at least one of the different groups of terminals is a variable time interval x-y that is scheduled depending on a network load experienced by, or expected for, the telecommunications network, and the terminals of the at least one of the different groups of terminals transmit an access request for accessing the additional resources of the telecommunications network to the telecommunications network in accordance with the variable time interval x-y included in the transmitted access denial information.

29. A terminal configured for use in a telecommunications network, wherein the telecommunications network is configured for providing access to a plurality of terminals that each have a unique identifier for accessing the telecommunications network, wherein the telecommunications network includes a register configured for storing the unique identifier of at least one terminal in combination with at least one grant access time interval, outside of which requesting access to additional resources of the telecommunications network for the at least one terminal is not permitted, and wherein the terminal comprises:

a message receiver configured for receiving a message from the telecommunications network, the message including access grant information specifying the grant access time interval for the terminal; and one or more processors, and memory storing processor instructions that, when executed by the one or more processors, cause the one or more processors to carry out operations including: an access request operation for transmitting an access request for accessing the additional resources of the telecommunications network to the telecommunications network in accordance with the at least one grant access time interval included in the access grant information received from the telecommunications network, wherein the terminal is part of at least one group of terminals of different groups of terminals, and each terminal of the at least one group operates one or more machine-to-machine applications not requiring immediate transfer of data, and wherein the grant access time interval for the terminals of at least one of the different groups of terminals is a variable time interval x-y that is scheduled depending on a network load experienced by, or expected for, the telecommunications network, and the terminals of the at least one of the different groups of terminals transmit an access request for accessing the additional resources of the telecommunications network to the telecommunications network in accordance with the variable time interval x-y included in the access grant information received from the telecommunications network.

30. A terminal configured for use in a telecommunications network, wherein the telecommunications network is configured for providing access to a plurality of terminals that each have a unique identifier for accessing the telecommunications network, wherein the telecommunications network includes a register configured for storing the unique identifier of at least one terminal in combination with at least one deny access time interval, during which requesting access to additional resources of the telecommunications network for the at least one terminal is not permitted, and wherein the terminal comprises:

a message receiver configured for receiving a message from the telecommunications network, the message including access denial including information specifying the at least one deny access time interval for the terminal; and one or more processors, and memory storing processor instructions that, when executed by the one or more processors, cause the one or more processors to carry out operations including: an access request operation for transmitting an access request for accessing the additional resources of the telecommunications network to the telecommunications network in accordance with the at least one deny access time interval included in the access denial information received from the telecommunications network, wherein the terminal is part of at least one group of terminals, and each terminal of the at least one group operates one or more machine-to-machine applications not requiring immediate transfer of data, and wherein the deny access time interval for the terminals of at least one of the different groups of terminals is a variable time interval x-y that is scheduled depending on a network load experienced by, or expected for, the telecommunications network, and the terminals of the at least one of the different groups of terminals transmit an access request for accessing the additional resources of the telecommunications network to the telecommunications network in accordance with the variable time interval x-y included in the access denial information received from the telecommunications network.

31. A register configured for use in a telecommunications network, wherein the telecommunications network is configured for providing access to a plurality of terminals, each terminal of the plurality comprising a unique identifier for accessing the telecommunications network, and wherein the register is further configured to store the unique identifier of at least one terminal in combination with at least one deny access time interval, during which requesting access to additional resources of the telecommunications network for the at least one terminal is not permitted, wherein the telecommunications network includes:

a serving controller entity configured for transmitting access denial information, including a specification of the at least one deny access time interval, to the at least one terminal, wherein the at least one terminal is configured to transmit an access request for accessing the additional resources of the telecommunications network to the telecommunications network in accordance with the at least one deny access time interval included in the access denial information transmitted by the serving controller; and one or more processors; and memory storing processor instructions that, when executed by the one or more processors, cause the one or more processors to carry out operations including:

an access request operation to receive an access request for accessing the additional resources of the telecommunications network from the at least one terminal and to determine the unique identifier associated with the at least one terminal;

wherein different groups of the terminals are defined, each terminal of which operates one or more machine-to-machine applications not requiring immediate transfer of data, and wherein the deny access time interval for the terminals of at least one of the different groups of terminals is a variable time interval x-y that is scheduled depending on a network load experienced by, or expected for, the telecommunications network, and the terminals of the at least one of the different groups of terminals transmit an access request for accessing the additional resources of the telecommunications network to the telecommunications network in accordance with the variable time interval x-y included in the access denial information transmitted by the serving controller.

32. A serving controller entity configured for use in a telecommunications network, wherein the telecommunications network is configured for providing access to a plurality of terminals, each terminal of the plurality comprising a unique identifier for accessing the telecommunications network, wherein the telecommunications network includes a register configured for storing the unique identifier of at least one terminal in combination with at least one deny access time interval, during which requesting access to additional resources of the telecommunications network for the at least one terminal is not permitted, wherein the serving controller entity comprises:

one or more processors; and memory storing processor instructions that, when executed by the one or more processors, cause the one or more processors to carry out operations including:

an access request operation to receive an access request for accessing the additional resources of the telecommunications network from the at least one terminal and to determine the unique identifier associated with the at least one terminal;

wherein the serving controller entity is further configured for transmitting access denial information, including a specification of the at least one deny access time interval, to the at least one terminal, wherein the at least one terminal is configured to transmit an access request for accessing the additional resources of the telecommunications network to the telecommunications network in accordance with the at least one deny access time interval included in the access denial information transmitted by the serving controller, wherein different groups of the terminals are defined, each terminal of which operates one or more machine-to-machine applications not requiring immediate transfer of data, and wherein the deny access time interval for the terminals of at least one of the different groups of terminals is a variable time interval x-y that is scheduled depending on a network load experienced by, or expected for, the telecommunications network, and the terminals of the at least one of the different groups of terminals transmit an access request for accessing the additional resources of the telecommunications network to the telecommunications network in accordance with the variable time interval x-y included in the access denial information transmitted by the serving controller.

* * * * *